United States Patent
Miller et al.

(10) Patent No.: US 7,346,657 B2
(45) Date of Patent: Mar. 18, 2008

(54) METHOD AND SYSTEM FOR VISUALLY DISPLAYING AND NAVIGATING VIRTUAL DISCUSSION GROUPS

(75) Inventors: Samuel T. Miller, Newcastle, CA (US); Donald J. Viola, Rocklin, CA (US); Kevin Hutler, Foresthill, CA (US); Richard D. Bowers, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1039 days.

(21) Appl. No.: 10/345,028

(22) Filed: Jan. 15, 2003

(65) Prior Publication Data

US 2004/0139155 A1    Jul. 15, 2004

(51) Int. Cl.
*G06F 15/16* (2006.01)
*G06F 3/00* (2006.01)

(52) U.S. Cl. ............... 709/204; 715/733; 709/224
(58) Field of Classification Search .......... 709/204, 709/205, 206, 207, 223, 228, 224; 715/514, 715/517, 733
See application file for complete search history.

(56) References Cited

U.S. PATENT DOCUMENTS

| | | | |
|---|---|---|---|
| 5,794,446 A * | 8/1998 | Earley et al. ............ | 60/646 |
| 5,894,305 A | 4/1999 | Needham | |
| 5,933,599 A | 8/1999 | Nolan | |
| 5,974,446 A | 10/1999 | Sonnenreich et al. | |
| 6,381,444 B1 | 4/2002 | Aggarwal et al. | |
| 6,430,574 B1 | 8/2002 | Stead | |
| 7,012,602 B2 * | 3/2006 | Watson et al. ........... | 345/419 |
| 2002/0112002 A1 | 8/2002 | Abato | |
| 2002/0119434 A1 | 8/2002 | Beams et al. | |
| 2003/0053612 A1 * | 3/2003 | Henrikson et al. ...... | 379/202.01 |
| 2003/0206203 A1 * | 11/2003 | Ly ......................... | 345/853 |
| 2004/0008635 A1 * | 1/2004 | Nelson et al. ............ | 709/204 |

OTHER PUBLICATIONS

On the Technical Side, Aug. 2, 2002, hp virtual classroom.
Sample RFP for hp classroom, Sep. 14, 2002, hp virtual classroom.
What's new in version 3.5, last updated Jul. 17, 2002, hp virtual classroom.
Conducting events in the hp virtual classroom, basic self-paced training for presenters, last updated Aug. 1, 2002, hp invent.
Conducting training events in the hp virtual classroom, self-paced training for presenters, last updated Aug. 1, 2002, hp invent.
C.R. Nave, Georgia State University, HyperPhysics, 2000, http://hyperphysics.phy-astr.gsu.edu/hbase/hph.html.

* cited by examiner

*Primary Examiner*—Paul H. Kang

(57) ABSTRACT

In accordance with a method embodiment of the present invention, a method for visually navigating through a plurality of virtual meetings is disclosed. The method may include displaying a hierarchical representation of the plurality virtual meetings having interconnected nodes, wherein each node of the hierarchical representation represents a subset of the plurality of virtual meetings. The method may further include that a node at the lowest order in the hierarchical representation is an individual virtual meeting and higher order nodes are an accumulation of all virtual meetings within lower order nodes that are interconnected with the higher order node. The method may also include moving within the hierarchical representation to obtain information about one or more of the plurality of virtual meetings, switching between views and selecting and searching amongst a plurality of views using a Boolean combination of such views. Systems and media incorporating the methods of the present invention are also disclosed.

27 Claims, 5 Drawing Sheets

METHOD AND SYSTEM FOR VISUALLY DISPLAYING AND NAVIGATING VIRTUAL DISCUSSION GROUPS

BACKGROUND OF THE INVENTION

1. Field of the Invention

The present invention relates generally to collaborative learning environments in a distributed network and, in particular, to methods and systems for visually displaying and navigating virtual classrooms.

2. Related Art

Public and private institutions of learning with classrooms of desks, chalkboards, overhead projectors and screens, video and television and like means for delivering knowledge have long been the traditional means for educating students. More recently, the Internet has provided a new medium for information storage and retrieval. The versatility of the Internet, rich multimedia content and the breadth of information contained therein are but a few of the reasons why educators are using the Internet to supplement or replace traditional means for educating students. But, there are many factors that have influenced the conventional means of training and educating. Such factors may include the limited availability of quality teachers, the globalization of institutions and corporations, the importance of skill updating, self-learning and an increase in part-time and continuing education have led to the popularity of alternative learning and training environments such as the Internet.

Among the more recent developments in the field of education are computer assisted "collaborative learning environments" for use over distributed networks. An example of such a collaborative learning environment is the Hewlett-Packard™ (HP) Virtual Classroom™, which facilitates a highly interactive training environment where participants can work as a group and collaborate on ideas, communicating with presenters and each other via voice, realtime text, or private one-on-one chat. The HP Virtual Classroom™ allows participants to ask questions, make comments and use a shared "White Board" to illustrate a point to the other classroom participants.

Conventional theories of organizational design are well documented in Daniel Robey, "Designing Organizations", Irwin, Homewood, Ill., Second Edition, 1986, the contents of which are incorporated herein by reference for all purposes. Views of an organization are useful for both management and employees. A conventional view for a hierarchical organization, such as the so-called "organization chart", that is broken down by functional areas, e.g., human resources, research and development, marketing, etc., are well known in the art. Other forms of organizational designs that take advantage of multi-disciplinary teams, such as the matrix organization, are also well known in the art. Facilitating views of an organization may lead to improved organizational design and greater efficiencies. Collaborative learning environments such as the HP Virtual Classroom™ are also useful for facilitating a user's view, or even the design of an organization.

For example, specialized teams comprised of individuals with expertise for solving problems are routinely assembled within organizations. Once the problems are solved, the temporary teams may be disassembled and the resources reassigned to other tasks, conventional or specialized as the case may be. At any given time there may be tens or hundreds of such specialized teams within a given organization that are concurrently working on problems or exchanging information using virtual classrooms in a collaborative learning environment. Such a collaborative learning environment may be used for training, presentations, problem solving or any other use that requires persons to communicate with one another using rich media. The term "event" may be used herein to refer to particular instances of training, presentations, problem solving over a defined period of time in a virtual classroom within the collaborative learning environment.

For users of such collaborative learning environments, it may be difficult to navigate through a large number of virtual classrooms. For example, it may be difficult to determine how many participants are in each virtual classroom, the content or subject matter of the presentation, which classes or groups of persons within the organization (or universe of participants) are using the virtual classrooms and the timing of such events or classes.

SUMMARY OF THE INVENTION

In accordance with a method embodiment of the present invention, a method for visually navigating through a plurality of virtual meetings is disclosed. The method may include displaying a hierarchical representation of the plurality virtual meetings having interconnected nodes, wherein each node of the hierarchical representation represents a subset of the plurality of virtual meetings. The method may further include that a node at the lowest order in the hierarchical representation is an individual virtual meeting and higher order nodes are an accumulation of all virtual meetings within lower order nodes that are interconnected with the higher order node. The method may also include moving within the hierarchical representation to obtain information about one or more of the plurality of virtual meetings. Systems and media incorporating the methods of the present invention are also disclosed.

A computer embodiment of the present invention is disclosed. The computer may include a display, a storage device for storing a computer program, a processor in communication with the display and the storage device. The processor is configured to execute the computer program. The computer program is configured for implementing a method for visually navigating through a plurality of virtual meetings in accordance with the present invention.

A system embodiment of the present invention is disclosed. The system may include a plurality of computers configured for network communication and a computer program installed on each of said plurality of computers for facilitating virtual meetings, the computer program configured for implementing a method according to the present invention.

A computer media embodiment of the present invention is disclosed. The computer media is configured to store a computer program for implementing a method according to the present invention.

BRIEF DESCRIPTION OF THE DRAWINGS

The following drawings illustrate exemplary embodiments for carrying out the invention. Like reference numerals refer to like parts in different views or embodiments of the drawings.

DETAILED DESCRIPTION

Figure 1:
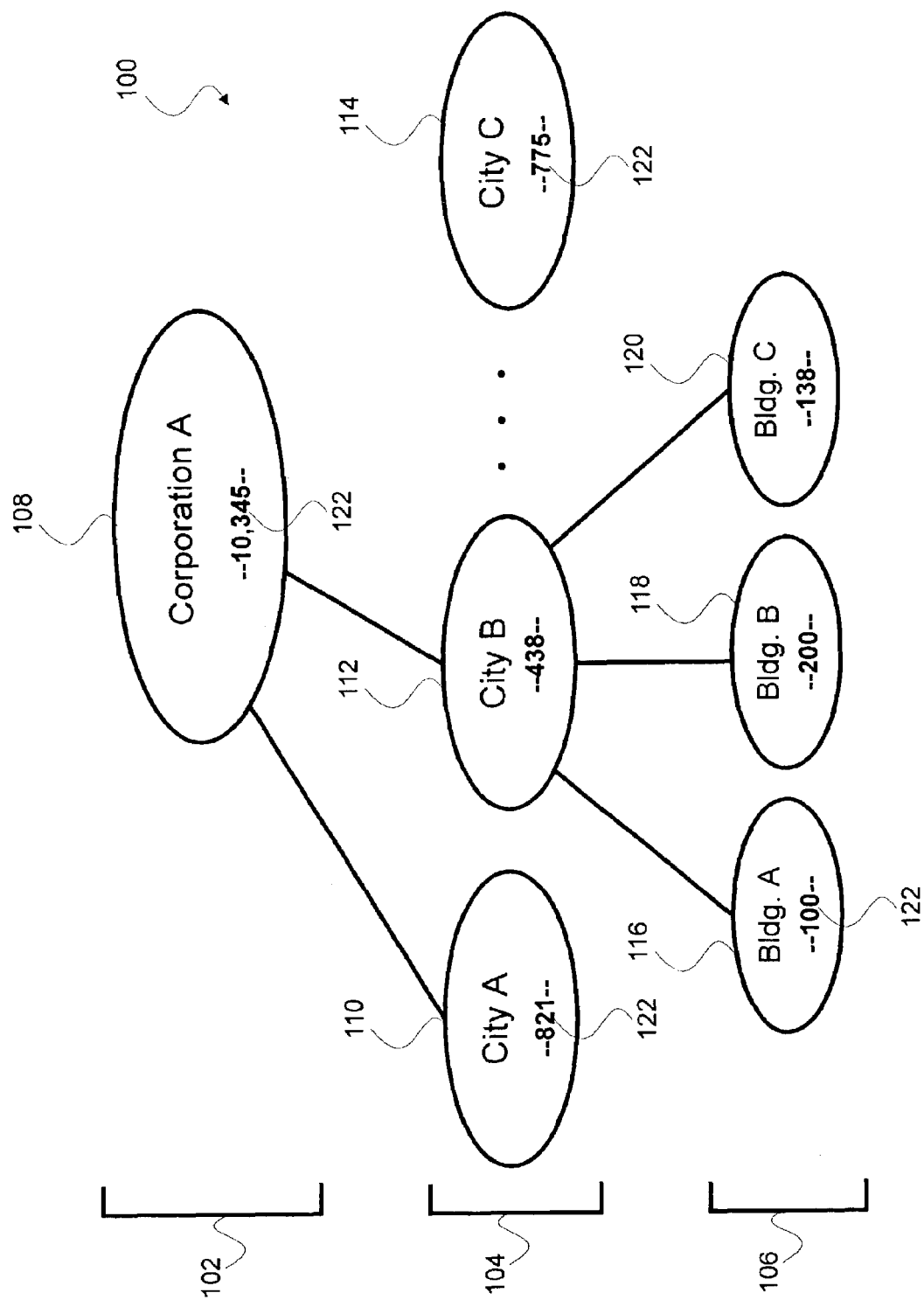
FIG. 1 is a diagram of an exemplary physical view of a plurality of virtual meetings in accordance with an embodiment of the present invention.

The invention includes methods and systems for visually displaying and navigating virtual classrooms. Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The term "virtual meeting" as used herein refers to any computer network based transfer of information between one or more participants in realtime. A "virtual meeting" may have a single lecturer or moderator who is conveying information to other participants. A "virtual meeting" may also be an open discussion amongst all participants. A "virtual meeting" may or may not include streaming video, a whiteboard and audio. As referred to herein, a conventional chat room with text alone may also be a "virtual meeting."

FIG. 1 is a block diagram of an exemplary physical view 100 of a plurality of virtual meetings in accordance with an embodiment of the present invention. The physical view 100 assumes that the universe of virtual meetings is a technology corporation with multiple physical plants located anywhere in the world. However, any size universe or organization is contemplated to be within the scope of the present invention. It is further assumed for this example that employees of the corporation are attending or scheduled to attend virtual meetings at various locations throughout the corporation's physical plants. As show in FIG. 1, the physical view 100 may include a plurality of interconnected nodes 108-120 (shown in ovals).

The physical view 100 may be hierarchically organized with various levels of abstraction 102, 104 and 106. For example, in a highest level of abstraction 102, the largest node 108 (as shown at the top of FIG. 1) may represent an entire organization, e.g., Corporation A. The next lower level of abstraction 104, comprised of a plurality of nodes 110, 112 and 114, may be representative of locations where the organization has physical plants, e.g., City A 110, City B 112, City C 114, etc. Other levels of abstraction are also contemplated. For example, node City B 112 may be comprised of Buildings A, B and C, shown as nodes 116, 118 and 120, respectively. Of course, the particular granularity of the levels of abstraction 102, 104 and 106 may be defined according to the particular application, i.e., the corporation-city-building abstraction of FIG. 1 is merely exemplary and not a limitation of the present invention.

Each node 108-120 within the physical view 100 may display information about the scope of its representation and a numerical indicator 122 of the number of participants in virtual meetings associated with that scope of representation. For example, node 102 is representative of Corporation A with a numerical indicator 122 that there are "10,345" participants in virtual meetings throughout Corporation A. At the next level of abstraction, City A 110 indicates "821" participants in virtual meetings throughout "City A." Similarly, City C 114 may have a numerical indicator 122 showing "775" participants in virtual meetings throughout City C. The same is true for all other levels of abstraction. So, at a glance, the user of the present invention can tell the number of participants in virtual meetings associated with the particular node.

Another aspect of the present invention is that the number of participants accumulates at higher levels of abstraction. For example, Buildings A, B and C have "100", "200" and "138" participants, respectively. The sum of participants in virtual meetings at buildings A, B and C (100+200+138=438) corresponds with the indicator for City B, i.e., "438". Other means for indicating the number of participants in a given node 108-120 are also contemplated within the scope of the present invention. For example, the relative size of the node 108-120 may be used to indicate the number of participants in a virtual classroom.

Figure 2:
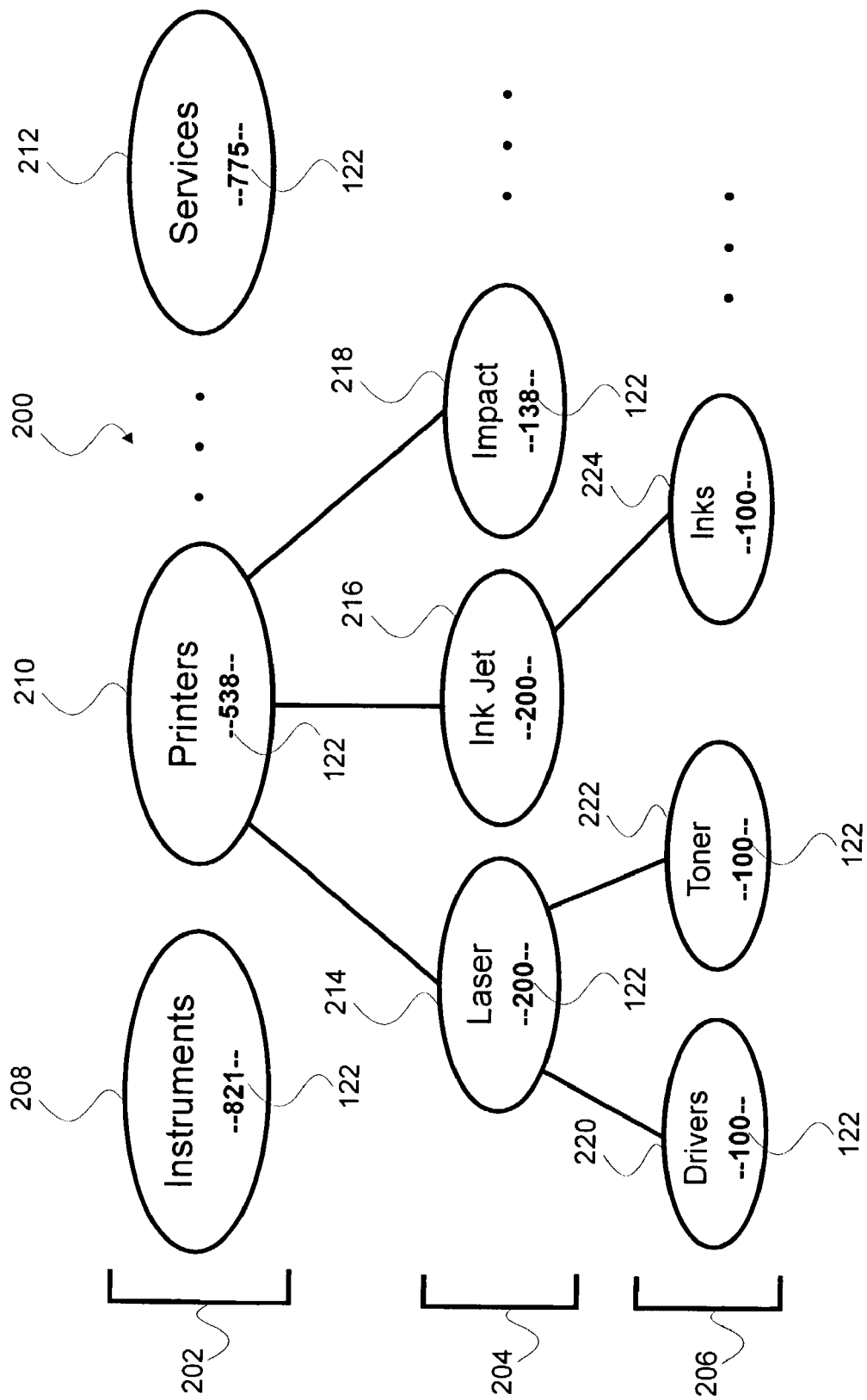
FIG. 2 is a diagram of an exemplary subject view of a plurality of virtual meetings in accordance with an embodiment of the present invention.

FIG. 2 is a block diagram of an exemplary subject view 200 of a plurality of virtual meetings in accordance with an embodiment of the present invention. The subject view 200 again assumes that the universe of virtual meetings is the same technology corporation described above with respect to a physical view 100, but further including multiple product lines. However, any size universe or organization with any product or subject list is contemplated to be within the scope of the present invention. For example, a virtual university with departments and classes of subject matter would be a suitable application of the present invention. It is further assumed for this example that each of the product lines may have employees attending, or scheduled to attend, virtual meetings where the subject matter of the meetings is related to a product line of the technology corporation. As show in FIG. 2, the subject view 200 may include a plurality of interconnected nodes 208-224 (shown in ovals).

Like the physical view 100, subject view 200 may also be hierarchically organized with various levels of abstraction 202, 204 and 206. In a highest level of abstraction 202, broad categories of subject matter may be represented by a plurality of nodes. For example, instruments 208, printers 210 and services 212 may be represented as broad categories of product lines associated with the exemplary technology company. The next level of abstraction 204, may further breakdown the subject matter of higher abstraction nodes. For example, printers 210 may be further decomposed by types of printers, e.g., laser 214, ink jet 216 and impact 218 printers. The types of printers may be further decomposed into component parts or other suitable subsystems or sub-categories. For example, laser 214 is shown decomposed into drivers 220 and toner 222. Any number of levels of abstraction is contemplated to be within the scope of the present invention.

Each node 208-224 within the subject view 200 may display information about the scope of its representation, i.e., subject matter. Each node 208-224 may also display a numerical indicator 122 of the number of participants in virtual meetings associated with that scope of representation. For example, printers 210 is representative of the technology corporation's printer product line with an indication 122 that there are "535" participants in virtual meetings relating to printer technology at the technology corporation. At the next level of abstraction, laser 214, ink jet 216 and impact 218 indicates "200", "200" and "138" participants in virtual meetings, respectively. So, at a glance, the user of the present invention can tell the number of participants in virtual meetings by subject matter.

In the subject view 200, the number of participants in virtual meetings accumulates up in levels of abstraction. At the third level of abstraction 206, drivers 220 and toner 222 indicate "100" and "100" participants in virtual meeting relating to their respective subject matter. Laser 214 indicates that there are "200" participants in virtual meetings relating to laser printers. Note that the sum of participants in drivers 220 ("100") and toner 222 ("100") equals the indication of the number of participants "200" in laser 214.

Figure 3:
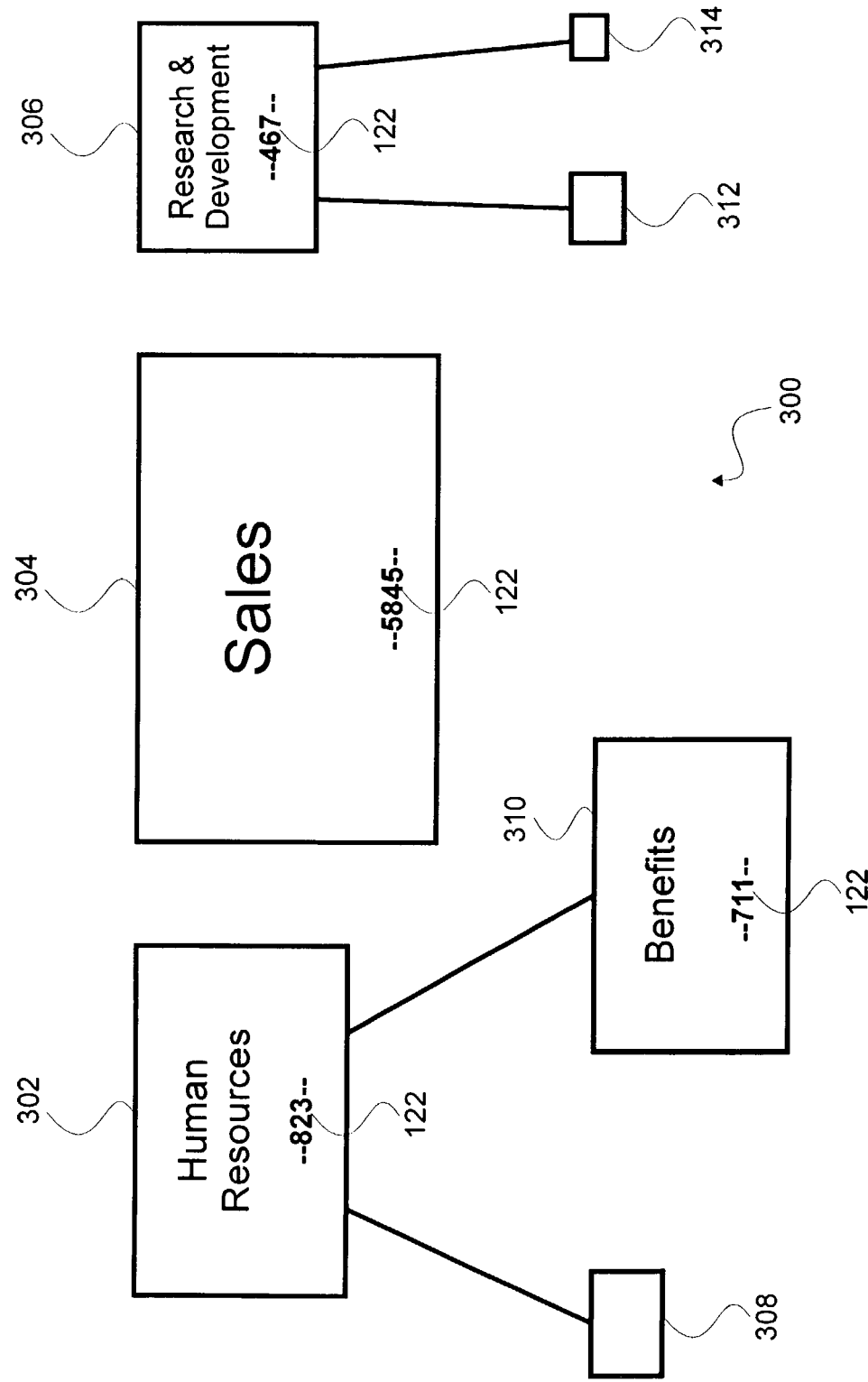
FIG. 3 is a block diagram of yet another function view of a plurality of virtual meetings in accordance with an embodiment of the present invention.

FIG. 3 is a block diagram of an exemplary function view 300 of a plurality of virtual meetings in accordance with an embodiment of the present invention. The function view 300 shown in FIG. 3 assumes that the universe of virtual meetings is same corporation described above with respect to the physical view 100 and the subject view 200, where the corporation includes multiple job functions served by its employees. The type or size of the organization is not critical to the present invention. As show in FIG. 3, the function view 300 may include a plurality of interconnected nodes 302-314 (shown in rectangles). The shape of the nodes 302-314 is not critical to the present invention, or to specific embodiments shown. The node may be ovals, circles, rectangles or other shapes according to the present invention.

Each node 302-314 within the function view 300 may display information about the scope of its representation, i.e., job function. Each node 302-314 may also display a numerical indicator 122 of the number of participants in virtual meetings associated with that scope of representation. For example, human resources 302 is representative of all human resources personnel in the exemplary corporation with a numerical indicator 122 that there are "823" participants in virtual meetings relating to human resources. So, at a glance, the user of the present invention can tell the exact number of participants in virtual meetings by subject matter.

The size of a node may also be used as a graphical indication of the relative number of participants in that node. For example, node 310 (benefits 310) is a relatively large node and node 314 is a relatively small node. Thus, a user would readily discern that there are relatively more participants in node 310 than in node 314. In other words, the relative size of the nodes may be positively correlated with relative number of participants in virtual meetings in the nodes, i.e., large nodes have larger numbers of participants, whereas small nodes have smaller numbers of participants. The ability to display node specific information is contemplated within the present invention. If desired, the user may select a node and thereby obtain information tailored to that node alone. Methods of selecting and displaying information are well known to one of skill in the art and, thus, will not be further elaborated herein.

The function view 300 may be hierarchically organized with various levels of abstraction (not shown for clarity). The levels of abstraction may be useful for decomposing functions within the function view 300. Any number of levels of abstraction is contemplated to be within the scope of the present invention. In the function view 300, the number of participants in virtual meetings may accumulate up in levels of abstraction as described above with respect to physical view 100 and subject view 200.

Variations on the view of levels of abstraction or decomposition of nodes may be automatically changed as a user moves within a view 100, 200, 300. Alternatively, a user may manually change aspects and perspectives within a particular view 100, 200, 300. Such variations on the appearance of particular views and means for coding in software or mechanizing hardware will be apparent to one of ordinary skill in the art.

Another aspect of the present invention is the capability of switching between the views 100, 200, 300 within the universe of virtual meetings. Thus, for a given universe of virtual meetings, such as the technology corporation described above, one can switch between a physical view 100, a subject view 200 and a function view 300 of the virtual meetings all within the same corporation. Yet another aspect of the present invention is the capability of displaying all virtual meetings as a tabular list with information such as the number of registrants, scheduled start and stop time, subject matter of the virtual meeting etc. In addition to allowing a user to switch between physical 100, topical 200 and functional 300 views, it is also within the scope of the present invention to allow a user to select and search amongst a plurality of virtual meetings on a Boolean combination of such views. Techniques for switching between views, displaying information, selecting and searching as described above will be apparent to one of skill in the art and, thus, will not be further elaborated on herein.

Another aspect of the present invention is the capability of displaying temporal information about the virtual meetings within any given view 100, 200, 300, hereinafter referred to as a "temporal view". For specific virtual meeting in one of the above-described views 100, 200, 300, a field within the node may indicate whether the virtual meeting is in progress or is scheduled in the future. The displaying of temporal information may be referred to herein as a temporal view. A temporal view may be displayed concurrently with any of the other described views 100, 200, 300. Alternatively, the use of colors may be used to indicate temporal information. These and other techniques for displaying temporal information about specific virtual meetings will be apparent to one of skill in the art and, thus, will not be further elaborated on herein.

Even yet another aspect of the present invention is the capability for a user to register for a virtual meeting and to obtain notification by email, instant messenger (IM), or other means prior to the start of the meeting. Techniques for interfacing the present invention to conventional email programs, e.g., Novell™ GroupWise™ and Microsoft™ Outlook™, for mechanizing the notification feature of the present invention will be within the knowledge of one of ordinary skill in the art. Similarly, techniques for interfacing the present invention to allow for notification by conventional IMs are also with the knowledge of those skilled in the art.

Yet another aspect of the present invention is the capability of providing information about how long the virtual meeting room will remain associated with a particular team of participants. This feature may be particularly useful where a team of interdisciplinary participants are assembled to solve a problem and thereafter will be disbanded and assigned to other projects or problems. Even yet another aspect of the present invention is the capability of indicating how long data and documents generated by and associated with a virtual meeting will persist. This feature gives participants an indication as to how long they will be able to obtain access to the data and documents commonly available to participants in the virtual meeting. These types of duration indicators may be implemented for display in any of the views 100, 200, 300 disclosed herein by one of ordinary skill in the art and, thus, will not be further elaborated on herein.

Figure 4:
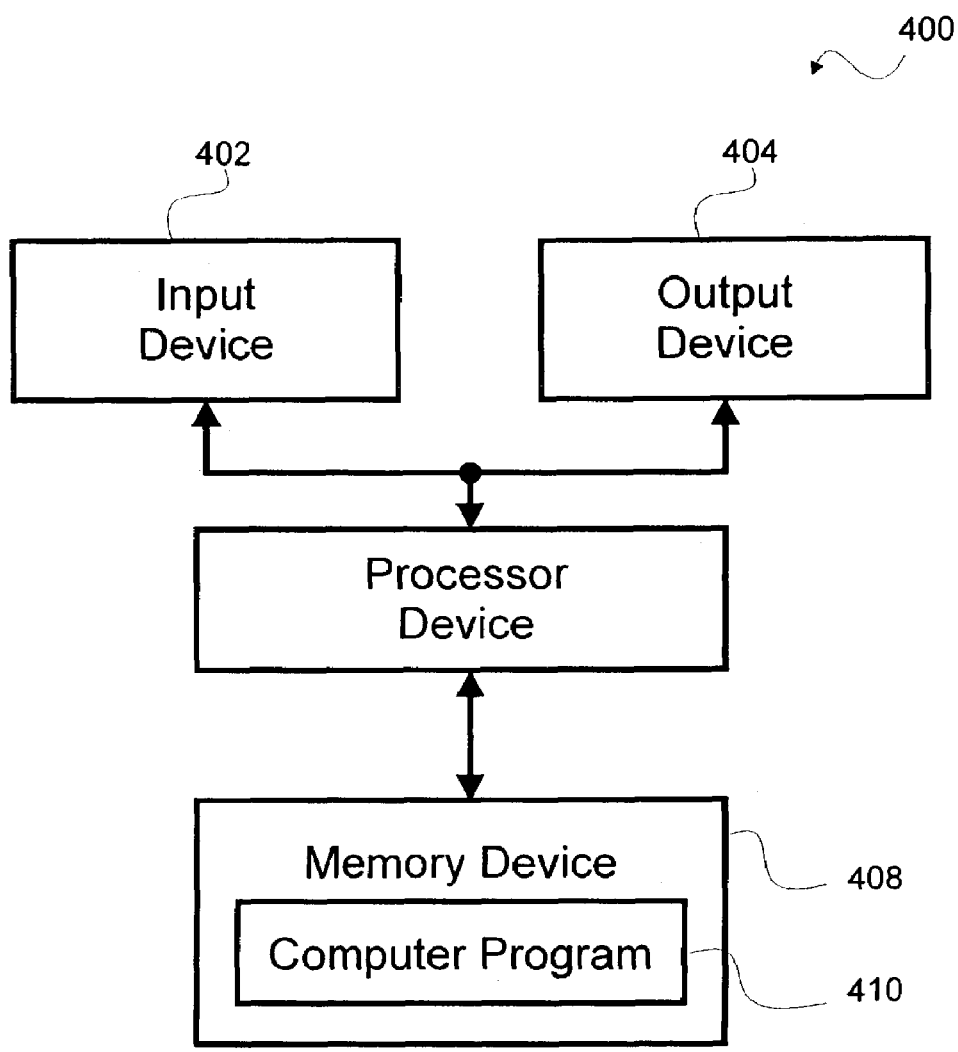
FIG. 4 is a block diagram of a system in accordance with the present invention.

FIG. 4 is a block diagram of a system 400 in accordance with the present invention. System 400 may include an input device 402 and output device 404 and a processor device 406 in communication with the input device 402 and the output device 404. System 400 may further include a memory device 408 in communication with the processor device 406. Memory device 408 may be configured to store a computer program 410 implementing a method according to the present invention and further described below. Processor device 406 may be a general-purpose microprocessor or any other kind of processor capable of executing computer instructions. Input device 402 may be a keyboard, mouse, touch pad or other input device configured to allow a user to provide input under computer control. Output device 404 may be a computer display for displaying views 100, 200, 300 as described above. In another aspect of the present invention, a plurality of systems 400 may be networked together through a local area network (LAN), wide area network (WAN), or public or private Internet. Such a "networked system" allows multiple users to manipulate the views 100, 200, 300 as described herein. Conventional computer systems and networks may be used with a software embodiment of the present invention.

Figure 5:
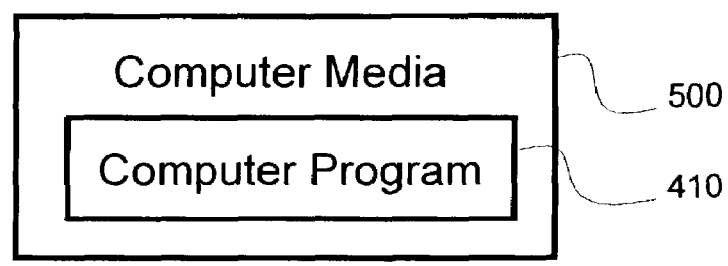
FIG. 5 is a block diagram of a computer media for storing a computer program configured for implementing a method according to the present invention.

FIG. 5 is a block diagram of a computer media 500 for storing a computer program 410 configured for implementing a method 600 according to the present invention. Computer media 500 may include magnetic or optical storage media or any other media capable of storing computer instructions.

Figure 6:
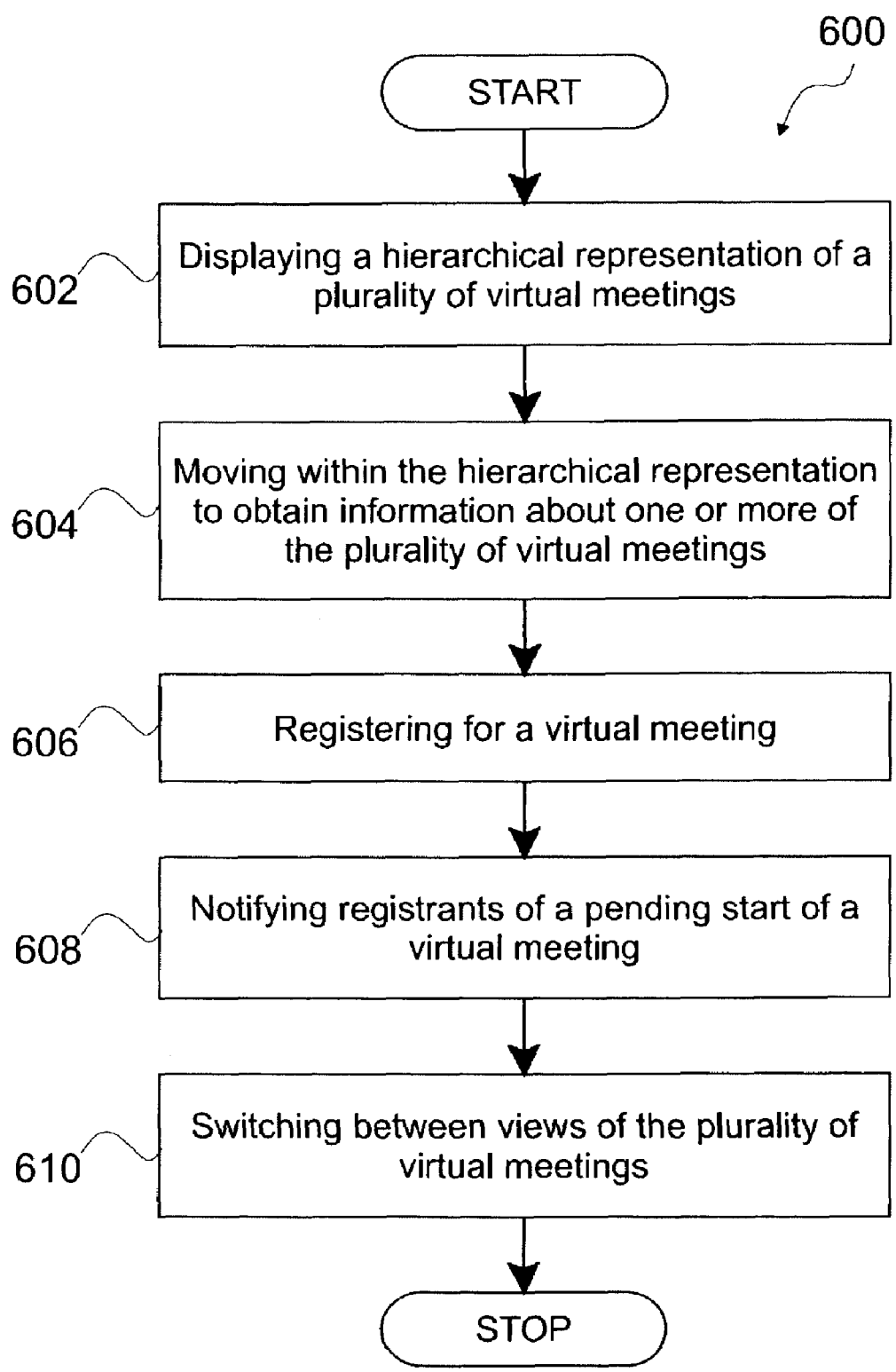
FIG. 6 is a flow diagram of a method of navigating a plurality of virtual meetings according to the present invention.

FIG. 6 is a flow diagram of a method 600 of navigating a plurality of virtual meetings according to the present invention. Method 600 may include displaying 602 a hierarchical representation of a plurality of virtual meetings having interconnected nodes, wherein each node of the hierarchical representation represents one or more virtual meetings. The hierarchical representation may include a physical view 100, subject view 200 or function view 300 of the universe of virtual meetings as described above. The hierarchical representation may include interconnected nodes each displaying temporal information, number of participants and other information as described above. Method 600 may further include moving 604 within the hierarchical representation to obtain information about one or more of the plurality of virtual meetings. Method 600 may further include registering 606 for a virtual meeting and notifying 608 registrants of a pending start of a virtual meeting. Notifying 608 a registrant may include sending an email to the registrant prior to the beginning of the meeting. Method 600 may further include switching 610 between views of the plurality of virtual meetings. Switching 610 between views allows a user to view the same universe of virtual meetings from different perspectives, e.g., a physical view 100, subject view 200 or function view 300 as described herein.

It is to be understood that the above-referenced arrangements are illustrative of the applications for the principles of the present invention. Numerous modifications and alternative arrangements may be devised without departing from the spirit and scope of the present invention. While the present invention has been shown in the drawings and described above in connection with the exemplary embodiments of the invention, it will be apparent to those of ordinary skill in the art that numerous modifications may be implemented without departing from the principles and concepts of the invention as set forth in the claims.

What is claimed is:

1. A method for visually navigating through a plurality of virtual meetings, comprising:

displaying a hierarchical representation of the plurality of virtual meetings having interconnected nodes, wherein each node of the hierarchical representation represents a subset of the plurality of virtual meetings, wherein a node at a lowest order in the hierarchical representation comprises an individual virtual meeting and a higher order node comprises an accumulation of all virtual meetings within lower order nodes interconnected with the higher order node;

wherein each node indicates a number of participants associated with all virtual meetings associated with the node and wherein a relative size of the nodes is positively correlated with relative numbers of participants associated with virtual meetings in the nodes; and moving within the hierarchical representation to obtain information about one or more of the plurality of virtual meetings.

2. The method according to claim 1, wherein displaying a hierarchical representation comprises displaying an organizational view of the plurality of virtual meetings wherein each node is associated with at least one organizational entity associated within one or more of the plurality of virtual meetings associated with the node.

3. The method according to claim 1, wherein displaying a hierarchical representation comprises displaying a topical view of the plurality of virtual meetings wherein each node designates subject matter being discussed within one or more of the plurality of virtual meetings associated with the node.

4. The method according to claim 1, wherein displaying a hierarchical representation comprises displaying a functional view wherein each node designates at least one occupational function represented within one or more of the plurality of virtual meetings associated with the node.

5. The method according to claim 1, wherein displaying a hierarchical representation comprises displaying a temporal view wherein each node designates when virtual meetings associated with the node are scheduled to occur.

6. The method according to claim 5, further comprising displaying a temporal view wherein individual virtual meeting nodes indicate how long the individual virtual meeting will remain associated with its participants.

7. The method according to claim 5, further comprising displaying a temporal view wherein individual virtual meeting nodes indicate how long data or documents generated by or associated with the individual virtual meeting will remain available to its participants.

8. The method according to claim 1, further comprising registering for a virtual meeting.

9. The method according to claim 1, further comprising notifying registrants of a pending start of a virtual meeting.

10. The method according to claim 9, wherein notifying registrants of a pending start of a virtual meeting comprises sending an email message.

11. The method according to claim 9, wherein notifying registrants of a pending start of a virtual meeting comprises sending an instant message.

12. The method according to claim 1, further comprising switching between views of the plurality of virtual meetings, wherein a view may be at least one of physical, topical, functional and temporal views.

13. The method according to claim 1, further comprising searching or selecting amongst the plurality of virtual meetings using a Boolean combination of physical, topical, functional and temporal views.

14. A system for conducting virtual meetings, comprising:
a plurality of computers configured for network communication; and
a computer program installed on each of said plurality of computers configured for:
presenting a hierarchical representation of the plurality virtual meetings having interconnected nodes, wherein each node of the hierarchical representation represents a subset of the plurality of virtual meetings, wherein a node at a lowest order in the hierarchical representation comprises an individual virtual meeting and a higher order node comprises an accumulation of all virtual meetings within lower order nodes interconnected with the higher order node;
wherein each node indicates a number of participants associated with all virtual meetings associated with the node and wherein a relative size of the nodes is positively correlated with relative numbers of participants associated with virtual meetings in the nodes; and
moving within the hierarchical representation to obtain information about one or more of the plurality of virtual meetings.

15. The system according to claim 14, wherein the computer program is further configured to allow a user to register for one or more virtual meetings.

16. The system according to claim 14, wherein the computer program is further configured for notifying registrants of a pending start of a virtual meeting using the network communication.

17. The system according to claim 16, wherein notifying registrants comprises sending an email message or instant message using the network communication.

18. The system according to claim 14, wherein the computer program is further configured for switching between views of the plurality of virtual meetings, wherein a view may be at least one of organizational, functional, temporal and topical views.

19. A computer media for storing a computer program, the computer program implementing a method for visually navigating through a plurality of virtual meetings, the method comprising:
displaying a hierarchical representation of the plurality of virtual meetings having interconnected nodes, wherein each node of the hierarchical representation represents a subset of the plurality of virtual meetings, wherein a node at a lowest order in the hierarchical representation comprises an individual virtual meeting and a higher order node comprises an accumulation of all virtual meetings within lower order nodes interconnected with the higher order node;
wherein each node indicates a number of participants associated with all virtual meetings associated with the node and wherein a relative size of the nodes is positively correlated with relative numbers of participants associated with virtual meetings in the nodes; and
moving within the hierarchical representation to obtain information about one or more of the plurality of virtual meetings.

20. A computer for visually navigating through a plurality of virtual meetings, the computer comprising:
a display;
a storage device for storing a computer program;
a processor in communication with the display and the storage device and configured to execute the computer program; and
wherein the computer program is configured for:
displaying a hierarchical representation of the plurality of virtual meetings having interconnected nodes, wherein each node of the hierarchical representation represents a subset of the plurality of virtual meetings, wherein a node at a lowest order in the hierarchical representation comprises an individual virtual meeting and a higher order node comprises an accumulation of all virtual meetings within lower order nodes interconnected with the higher order node;
wherein each node indicates information with all virtual meetings associated with the node and wherein a relative size of the nodes is positively correlated with relative numbers of participants associated with virtual meetings in the nodes; and
shifting views within the hierarchical representation to obtain information about one or more of the plurality of virtual meetings.

21. The computer according to claim 20, wherein the computer program is further configured to allow a user to register for one or more virtual meetings.

22. The computer according to claim 20, wherein the computer program is further configured for notifying registrants of a pending staff of a virtual meeting.

23. The computer according to claim 22, wherein notifying registrants comprises sending an email message.

24. The computer according to claim 22, wherein notifying registrants comprises sending an instant message.

25. The computer according to claim 20, wherein the computer program is further configured for switching between views of the plurality of virtual meetings, wherein a view may be one of organizational, functional, temporal and topical views.

26. The computer according to claim 20, wherein a node associated with an individual virtual meeting indicates how long a team of participants in the individual virtual meeting will persist.

27. The computer according to claim 20, wherein a node associated with an individual virtual meeting indicates how long data or documents associated with or generated by participants of the individual virtual meeting will persist.

* * * * *

UNITED STATES PATENT AND TRADEMARK OFFICE
CERTIFICATE OF CORRECTION

| | |
|---|---|
| PATENT NO. | : 7,346,657 B2 |
| APPLICATION NO. | : 10/345028 |
| DATED | : March 18, 2008 |
| INVENTOR(S) | : Samuel T. Miller et al. |

It is certified that error appears in the above-identified patent and that said Letters Patent is hereby corrected as shown below:

On the Title Page, Item (56) "Other Publications", line 2, after "hp" insert -- virtual --.

In column 10, line 37, in Claim 22, delete "staff" and insert -- start --, therefor.

Signed and Sealed this

Twenty-second Day of July, 2008

JON W. DUDAS
*Director of the United States Patent and Trademark Office*